Dec. 8, 1936.  F. R. BISHOP  2,063,657
OPHTHALMIC MOUNTING
Filed March 26, 1936

Inventor.
Frederick R. Bishop
by David Rines
Atty.

Patented Dec. 8, 1936

2,063,657

UNITED STATES PATENT OFFICE 2,063,657

OPHTHALMIC MOUNTING

Frederick Rice Bishop, North Attleboro, Mass., assignor to The Bishop Company, North Attleboro, Mass., a corporation of Massachusetts Application March 26, 1936, Serial No. 70,955

4 Claims. (Cl. 88—47)

The present invention relates to ophthalmic mountings, and more particularly to mountings the lenses of which depend wholly below the bridge.

It has heretofore been proposed to supply mountings of this character with bridges the ends of which extend outwardly along substantially a straight line beyond the lenses, temples being pivoted to the extending ends of the bridge. These rectilinearly extending ends of the bridge are objectionable. It has also been proposed to secure adjustable guard arms directly to the bridge, but such arms are necessarily so long that they bend out of proper adjustment, thus destroying the proper alinement of the lenses.

An object of the present invention is to provide a new and improved ophthalmic mounting of the above-described character with a bridge short enough so that the lenses thereof shall depend wholly below the ends of the bridge, thus eliminating the objectionable extending ends of the prior art, the bridge being, however, provided with unobjectionably positioned extensions that add to, rather than detract from, the effectiveness of the mounting.

A further object is to provide short guard arms, properly positioned, so as to overcome the above-described defect of misalinement of the lenses.

Figure 1:
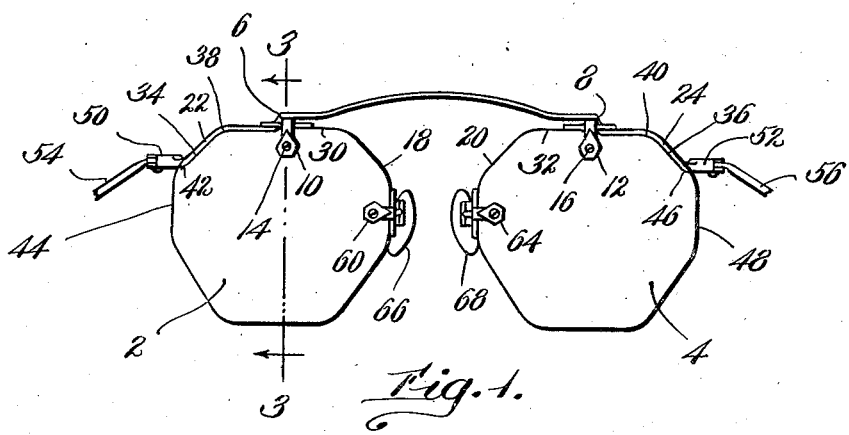
Figure 2:
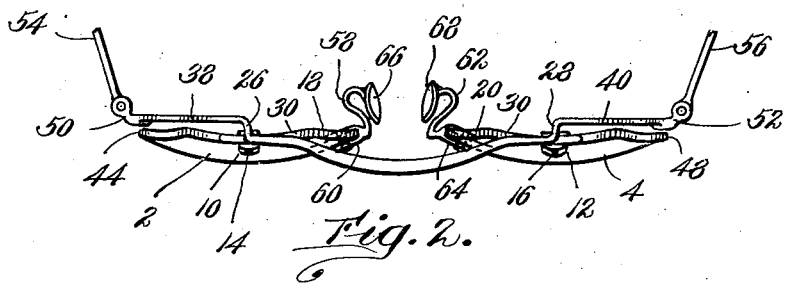
Figure 3:
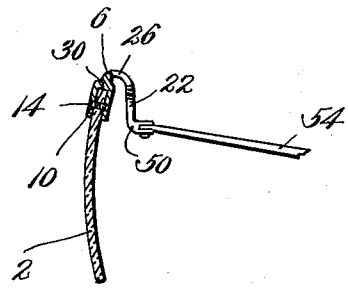

Other and further objects will be explained in connection with the accompanying drawing, in which Fig. 1 is a front elevation of an ophthalmic mounting embodying the present invention; Fig. 2 is a corresponding plan; and Fig. 3 is a section taken upon the line 3—3 of Fig. 1, looking in the direction of the arrows.

The bridge of the present invention is of a length substantially equal to the distance between the centers of the lenses 2 and 4, which are shown as of the rimless type. One end 6 of the bridge is positioned substantially above the center of the lens 2 and the other end 8 of the bridge is positioned substantially above the center of the lens 4. The end 6 of the bridge is provided with a lens-holding ear or ears 10 and the end 8 with a lens-holding ear or ears 12, these ears depending from, and being disposed wholly below, the respective ends 6 and 8 of the bridge. The lens 2 may be held in the ear or ears 10 in any approved manner, as by means of a screw 14, the lens 4 being shown similarly held by a screw 16 in the ear or ears 12. The lenses 2 and 4 are thus disposed wholly below the ends 6 and 8 of the bridge, with the oppositely disposed, inner portions 18 and 20 thereof entirely free of bridge connections, except through the medium of the ears 10 and 12, from the very top of each lens to the very bottom thereof.

In order, however, to provide temple connections for the mounting, the bridge is provided with two outwardly extending arms 22 and 24. Though it is preferred to make these arms 22 and 24 in one piece, or integral, with the bridge, they nevertheless function as two arms separate from the bridge, as they are positioned, not in a direct line outward above the respective lenses, but behind the lenses. This will be understood more particularly from Fig. 2, where the right-hand end of the arm 22 is shown provided with a portion 26 that extends rearward from the end 6 of the bridge for a relatively short distance, and the arm 24 is provided with a similar short portion 28 that extends similarly from the end 8 of the bridge. The arms 22 and 24 are thus enabled to extend outward, beyond the short portions 26 and 28, out of contact with the lenses. If desired, the arms 22 and 24 may extend slightly above the peripheries of the respective lenses, but it is preferred to hide them behind the lenses, though they are naturally visible therethrough. In Fig. 1, they are shown conforming substantially to the shapes of the upper portions of the respective lenses, and positioned just below the upper edges of the lenses. As the lenses are shown as of octagonal shape, therefore, the arms extend first horizontally beyond the short portions 26 and 28, substantially parallel to the upper edges 30 and 32 of the respective lenses, and then at a downward incline, substantially parallel to the inclined edges 34 and 36 of the respective lenses, thus producing bends 38 and 40 in the respective arms 22 and 24. The left-hand end 42 of the arm 22 is disposed near an upper portion of the lens 2, at a point close to the periphery of the lens 2, near the intersection between its vertical edge 44 and its inclined edge 34; and the right-hand end 46 of the arm 24 is similarly disposed near an upper portion of the lens 4, at a point close to the periphery of the lens 4, near the intersection of its vertical edge 48 and its inclined edge 36. The ends 42 and 46 of the arms 22 and 24 are respectively provided with end pieces 50 and 52 that project outward and rearward beyond the peripheries of the respective lenses, as clearly shown in Figs. 1 and 2, thus giving the appearance of a mounting the end pieces of which are secured directly to the lenses. A temple 54 is pivoted to the end piece 50 in any well known way, and a temple 56 is similarly pivoted to the end piece 52. With this construction, it is possible to adjust the arms 22 and 24 so as to position the temples anywhere desired, yet the arms 22 and 24 are hidden behind the lenses (though visible therethrough) so as not to cause any interference between the lenses and the arms during the adjustment. The appearance of the mounting, furthermore, is greatly enhanced.

A guard arm 58 is provided at one end with an ear or ears 60 by means of which it may be secured to the inner portion 18 of the lens 2, substantially at a point half way between the upper and lower edges of the lens 2, as illustrated. A guard arm 62 is similarly provided at one end with an ear or ears 64 by means of which it may similarly be secured to the inner portion 20 of the lens 4. The guard arms 58 and 62 are thus carried by the ears 60 and 64 that are secured to the inner portions 18 and 20 of the lenses. The other end of the guard arm 58 carries a guard 66 and the other end of the guard arm 62 a guard 68.

By reason of this construction, it is possible to adjust the guard arms 58 and 62 so that the lenses 2 and 4, when mounted on the face, shall be positioned with their centers exactly in front of the pupils of the eyes. Once so adjusted, they will stay adjusted, no matter how many times the bridge is flexed to put the mounting on the face or to take it off. The adjustment of the guard arms 58 and 62 in no way interferes with the adjustment of the temple arms 22 and 24 or vice versa. In the case of the rimless lenses shown, only two openings are needed for each lens, one for receiving the screw 14 or 16 and the other for receiving the guard-arm ear or ears 60 and 64. No additional openings for receiving the temple-carrying members are required, for the temple-carrying arms 22 and 24 are carried by the ends 6 and 8 of the bridge.

Modifications will occur to persons skilled in the art, and all such are considered to fall within the spirit and scope of the invention, as defined by the appended claims.

What is claimed is:

1. An ophthalmic mounting comprising a bridge, lens-holding members depending from and disposed wholly below the ends of the bridge, lenses carried by the respective lens-holding members and positioned wholly below the corresponding ends of the bridge with the said ends of the bridge respectively substantially above the centers of the respective lenses, two arms one end of each of which is fixed to one of the ends of the bridge, the arms extending outward from the said ends of the bridge and to the rear of, and out of contact with, the respective lenses but conforming substantially to the shapes of the upper portions of the respective lenses, the other end of each arm beieng disposed at a point close to the periphery of the corresponding lens near an upper portion of the lens and being provided with an end piece projecting outward beyond the said periphery, and a temple pivoted to each end piece.

2. An ophthalmic mounting comprising a bridge, lens-holding members depending from and disposed wholly below the ends of the bridge, lenses carried by the respective lens-holding members and positioned wholly below the corresponding ends of the bridge with the said ends of the bridge respectively substantially above the centers of the respective lenses, two arms one end of each of which is fixed to one of the ends of the bridge, the arms extending from the said ends of the bridge rearward for a relatively short distance, then outward along, but out of contact with, the respective lenses so as to conform substantially to the shapes of the upper portions of the respective lenses, the other end of each arm being disposed at a point close to the periphery of the corresponding lens near an upper portion of the lens and being provided with an end piece projecting outward and rearward beyond the said periphery, and a temple pivoted to each end piece.

3. An ophthalmic mounting comprising a bridge, lens-holding members depending from and disposed wholly below the ends of the bridge, lenses carried by the respective lens-holding members and positioned wholly below the corresponding ends of the bridge with the said ends of the bridge respectively substantially above the centers of the respective lenses, two arms one end of each of which is fixed to one of the ends of the bridge, the arms extending outward from the said ends of the bridge and to the rear of, and out of contact with, the respective lenses but conforming substantially to the shapes of the upper portions of the respective lenses, the other end of each arm being disposed at a point close to the periphery of the corresponding lens near an upper portion of the lens and being provided with an end piece projecting outward beyond the said periphery, a temple pivoted to each end piece, a guard arm for each lens, one end of each guard arm being held fixed to the inner portion of the corresponding lens, and a guard carried by the other end of each guard arm, the guard arms being adjustable to position the said centers of the lenses exactly in front of the pupils of the eyes.

4. An ophthalmic mounting comprising a bridge, a lens-holding ear depending from and disposed wholly below each end of the bridge, rimless lenses carried by the lens-holding ear at the respective ends of the bridge and positioned wholly below the corresponding ends of the bridge and with the said lens-holding ear at the respective ends of the bridge respectively substantially above the centers of the respective lenses, two arms one end of each of which is fixed to one of the ends of the bridge, the arms extending from the said ends of the bridge rearward for a relatively short distance, then outward along, but out of contact with, the respective lenses so as to conform substantially to the shapes of the upper portions of the respective lenses, the other end of each arm being disposed at a point close to the periphery of the corresponding lens near an upper portion of the lens and being provided with an end piece projecting outward and rearward beyond the said periphery, a temple pivoted to each end piece, a guard arm for each lens, one end of each guard arm being held fixed to the inner portion of the corresponding lens, and a guard carried by the other end of each guard arm, the guard arms being adjustable to position the said centers of the lenses exactly in front of the pupils of the eyes.

FREDERICK R. BISHOP.